United States Patent [19]

Ogura et al.

[11] 3,876,595

[45] Apr. 8, 1975

[54] PROCESS FOR PRODUCING OLEFINIC COPOLYMERS

[75] Inventors: Masatoshi Ogura; Keisaku Yamamoto, both of Ichihara, Japan

[73] Assignee: Sumitomo Chemical Company, Limited, Osaka, Japan

[22] Filed: Feb. 26, 1973

[21] Appl. No.: 335,774

[30] Foreign Application Priority Data
Feb. 28, 1972  Japan.............................. 47-20354

[52] U.S. Cl. ............ 260/80.78; 260/80.6; 260/890; 260/3
[51] Int. Cl. .......................................... C08f 17/00
[58] Field of Search ................................ 260/80.78

[56] References Cited
UNITED STATES PATENTS

| | | | |
|---|---|---|---|
| 3,222,330 | 12/1965 | Nyce et al.......................... | 260/80.5 |
| 3,705,138 | 12/1972 | van den Berg..................... | 260/80.7 |

FOREIGN PATENTS OR APPLICATIONS

| | | | |
|---|---|---|---|
| 1,480,504 | 5/1967 | France.............................. | 260/80.78 |
| 1,170,406 | 11/1969 | United Kingdom.............. | 260/80.78 |
| 1,192,770 | 5/1970 | United Kingdom.............. | 260/80.78 |
| 1,908,327 | 7/1970 | Germany.......................... | 260/80.78 |
| 951,022 | 4/1964 | United Kingdom.............. | 260/80.78 |
| 12,155 | 6/1969 | Japan.............................. | 260/80.78 |

*Primary Examiner*—Joseph L. Schofer
*Assistant Examiner*—A. L. Clingman
*Attorney, Agent, or Firm*—Stevens, Davis, Miller & Mosher

[57] ABSTRACT

A halogen-containing, sulfur-curable, normally amorphous quadripolymer is produced by contacting a mixture of (1) ethylene, (2) an α-olefin having the formula, $R—CH=CH_2$ wherein R is a hydrocarbon radical having one to 20 carbon atoms, (3) a hydrocarbon compound having a plurality of non-conjugated unsaturated bonds capable of polymerizing with a coordinated catalyst, and (4) a halogenated norbornene compound represented by the formula,

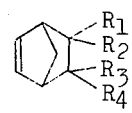

wherein $R_1$, $R_2$, $R_3$ and $R_4$ are hydrogen atoms, hydrocarbon radicals having one to 20 carbon atoms, halogen atoms, or halogenated hydrocarbon radicals having one to 20 carbon atoms and containing at least one halogen atom as substituent, provided that $R_1$, $R_2$, and $R_4$ have as a whole at least one halogen atom, with a coordinated catalyst comprising an organoaluminum compound of the formula, $AlR'_nX_{3-n}$, wherein $R'$ is a hydrocarbon radical having 1 to 20 carbon atoms, X is a halogen atom, and $n$ is any number of from 1.5 to 3, and a transition metal compound selected from the group consisting of vanadium compounds and titanium compounds, the molar ratio of said organoaluminum compound to said transition metal compound being from 5 : 1 to 0.5 : 1. The rate of vulcanization of the said quadripolymer is freely controllable by varying the non-conjugated diene content thereof.

23 Claims, No Drawings

PROCESS FOR PRODUCING OLEFINIC COPOLYMERS

This invention relates to a process for producing a sulfur-curable quadripolymer, characterized by contacting ethylene, an α-olefin, a non-conjugated diene, and a halogenated norbornene compound with a coordinated catalyst.

Concerning the process for producing a ternary copolymer, many research reports have been disclosed and numerous patents have been granted. However, since copolymers obtained by these processes possess no polar groups, they are inferior in oil resistance, tackiness, adhesion, and co-vulcanization with other rubber species, and hence, the use thereof as elastomer has been limited to some cases. If the above-mentioned physical properties are imparted to the copolymers, they will be expected to be used in many various uses. As a result of studies on copolymerization of α-olefins and monomers having a polar group, particularly a halogen atom, for the purpose of improving the aforesaid physical properties, the present inventors have now accomplished this invention.

Regarding copolymerization of a halogenated monomer and an α-olefin, Japanese Patent Publication No. 27,875/64 discloses the copolymerization of a halogen-containing α-olefin and one or more other α-olefins. However, in the copolymerization of ethylene and an α-olefin with an anionic coordinated catalyst, an aliphatic olefin is far less reactive than ethylene, and the reactivity tends to decrease as R in the formula, R—CH=CH$_2$, becomes larger. The same applies to the case of a halogenated aliphatic olefin, and accordingly a large excess of the halogenated aliphatic olefin must be added to ethylene to expect copolymerization with ethylene. On the other hand, however, because of its molecular weight regulating effect, addition of a large amount of a halogenated olefin makes the formation of a high molecular weight copolymer difficult and frequently results in deterioration of various physical properties, such as dynamic properties and the like, of the copolymer.

Therefore, in order to obtain a high molecular weight copolymer, it is necessary to carry out polymerization at a low temperature such as, for example, about 0°C. When the polymerization is carried out in homogeneous solution and if the polymerization temperature is low, the viscosity of the polymerization system will be extremely increased, bringing about difficulties in removal of the heat of reaction and in uniform agitation, thus causing a great deal of inconveniences in polymer production. In the case of a halogenated norbornene compound, which has a double bond in the ring having a very high polymerization activity, the reactivity of the compound with ethylene is so high that a high molecular weight copolymer may easily be produced. In some cases, it is even possible to use a molecular weight regulating agent. Consequently, polymerization is not required to be carried out at a low temperature, and, accordingly, the viscosity of the polymerization system may be kept low by conducting the polymerization at 20° to 70°C. or thereabout. On the other hand, if a catalyst of the Ziegler-Natta type is used, a side reaction such as dehydrohalogenation or ring-opening polymerization is liable to occur because the organoaluminium compound in the catalyst acts as a Lewis acid.

The present inventors have been found that these side reactions can be reduced to a minimum and a halogen-containing monomer can be copolymerized well with ethylene and an α-olefin to increase the halogen content of the polymer, by using an organoaluminum compound having a low Lewis acidity (i.e., in the formula AlR′$_n$X$_{3-n}$, 1.5 ≦ n ≦ 3) and keeping the molar ratio of the organoaluminum compound to a transition metal compound within the range of from 5/1 to 0.5/1.

Thus, the present invention provides a process for producing a halogen-containing, sulfurcurable, normally amorphous quadripolymer, characterized by contacting a mixture of (1) ethylene, (2) an α-olefin having the formula, R—CH=CH$_2$ wherein R is a hydrocarbon radical having one to 20 carbon atoms, (3) a hydrocarbon compound having a plurality of non-conjugated unsaturated bonds capable of polymerizing with a coordinate catalyst, and (4) a halogenated norbornene compound represented by the formula,

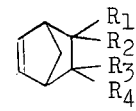

wherein R$_1$, R$_2$, R$_3$, and R$_4$ are hydrogen atoms, hydrocarbon radicals having one to 20 carbon atoms, halogen atoms, or halogenated hydrocarbon radicals having one to 20 carbon atoms and containing at least one halogen atom as substituent, provided that R$_1$, R$_2$, R$_3$ and R$_4$ have as a whole at least one halogen atom, with a coordinated catalyst comprising an organoaluminum compound of the formula, AlR′$_n$X$_{3-n}$ wherein R′ is a hydrocarbon radical having one to 20 carbon atoms, X is a halogen atom, and n is any number of from 1.5 to 3 and a transition metal compound selected from the group consisting of vanadium compounds and titanium compounds, the molar ratio of said organoaluminum compound to said transistion metal compound being from 5:1 to 0.5:1.

The α-olefins, represented by the formula R—CH=CH$_2$, to be used in this invention are preferably those which contain alkyl, aryl, aralkyl, alkylaryl, or cycloalkyl groups having one to 20 carbon atoms; those which contain an alkyl group having one to eight carbon atoms give particularly good results. Examples of such compounds include propylene, butene-1, pentene-1, 4-methylpentene-1, hexene-1, octene-1, nonene-1, decene-1, 5-methylnonene-1, 5,5-dimethyloctene-1, 4-methylhexene-1, 4-methylheptene-1, 6-methylheptene-1, 5,6,6-trimethylheptene-1, styrene, 4-phenylheptene-1, 4-cyclohexylhexane-1, etc. In most cases, desirable results are obtained when ethylene and propylene or butene-1 are used.

The hydrocarbon compounds having a plurality of non-conjugated unsaturated bonds for use in this invention are those which can be used in preparing sulfurcurable EPT rubbers, such as non-conjugated polyene compounds of bridged-ring hydrocarbon compounds, monocyclic compounds, fused ring compounds, aliphatic hydrocarbon compounds, and spiro compounds. The non-conjugated polyene compounds include specifically dicyclopentadiene, tricyclopentadiene, 5-methyl-2,5-norbornadiene, 5-methylene-2-norborene, 5-ethylidene-2-norbornene, 5-isopropylidene-2-norbornene, 5-isopropenyl-2-norbornene, 5-(1′-butenyl)-2-norbornene, 5-(2′-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 1,4hexadiene 1,6octadiene, 6-methyl-1,5-heptadiene, etc.

The rate of curing of the copolymer obtained according to the process of this invention can be modulated by varying the non-conjugated diene content within the range of 1 to 100, most preferably about 2 to 20, in terms of iodine value, The quadripolymer of this invention is characterized in that it can be sufficiently cured even when the degree of unsaturation corresponds to an iodine value smaller than generally required for sulfur-curing, owing to the crosslinking-accelerating effect of the halogen atoms contained in the copolymer.

The halogenated norbornene compounds usable in this invention have the formula,

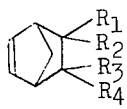

wherein $R_1$, $R_2$, $R_3$ and $R_4$ are hydrogen atoms, alkyl groups having one to 20 carbon atoms, halogen atoms such as F, Cl, Br, and I, or hydrocarbon radicals having one to 20 carbon atoms and containing at least one halogen atom, provided that $R_1$, $R_2$, $R_3$ and $R_4$ have as a whole at least one halogen atom. Typical examples of such compounds include 5-chloro-2-norbornene, 5-bromo-2-norbornene, 5-iodo-2-norbornene, 5,5-dichloro-2-norobornene, 5,6-dichloro-2-norbornene, 5,5,6-trichloro-2-norbornene, 5-chloro-6-methyl-2-norbornene, 5-chloromethyl-2-norbornene, 5-bromo-methyl-2-norbornene, 5,6-dichloromethyl-2-norbornene, 5,5,6,6-tetrachloronorbornene, 5-(1',2'-dichloroethyl)-2-norbornene, 5-ω-chlorooctyl-6-octyl-2-norbornene, etc.

The organoaluminum compound of the formula $AlR'_mX_{3-n}$, as a component of the coordinated catalyst used in this invention, contains as R' preferably such groups as alkyl, aryl, aralkyl, alkylaryl, and cycloalkyl having one to 20 carbon atoms; particularly, an alkyl group having one to six carbon atoms gives favorable results. However, those containing other hydrocarbon radicals such as cyclopentadienyl group and alkenyl group may also be used, if necessary. In the above formula, X is chlorine, bromine, or iodine, or in some cases, may be fluorine, and n is any number of from 1.5 to 3. The organoaluminum compound is not necessarily a single compound, and may be any mixture having a mean composition corresponding to the formula.

Examples of such organoaluminum compounds include ethylaluminum sesquichloride, ethylaluminum sesquibromide, ethylaluminum sesquiiodide, methylaluminum sesquichloride, n-propylaluminum sesquichloride, isobutylaluminum sesquichloride, n-hexylaluminum sesquichloride, cyclohexylaluminum sesquichloride, 2-ethylhexylaluminum sesquichloride, laurylaluminum sesquichloride, diethylaluminum chloride, dimethylaluminum chloride, di-n-butylaluminum chloride, ethylpropenylaluminum chloride, dicyclopentadienylaluminum chloride, cyclohexylethylaluminum chloride, trimethylaluminum, triethylaluminum, tripropylaluminum, triisobutylaluminum trihexylaluminum, tridecylaluminum, triphenylaluminum, tricyclohexylaluminum, tribenzylaluminum, and mixtures of these compounds in any proportions.

In the process of this invention, particularly preferable results are obtained when an ethylaluminum sesquihalide, a diethylaluminum halide or a mixture containing the two is used as the compound represented by the above-mentioned formula $AlR'_nX_{3-n}$.

The above component of the coordinated catalyst for use in this invention is a vanadium compound or a titanium compound. A preferred vanadium compound is a tri- to pentavalent vanadium compound having at least one group selected from the class consisting of halogens, alkoxy cyclopentadienyl, and symmetric or asymmetric diacylmethyl, particularly acylacetonyl. The above compounds include vanadium halides, vanadyl halides, vanadium acetylacetonate, vanadyl acetylacetonate, vanadium haloacetylacetonates, vanadyl haloacetylacetonates, esters of orthovanadic acid such as vanadates containing a hydrocarbon radical having one to 20 carbon atoms, particularly an alkyl group having one to eight carbon atoms; vanadyl haloalkoxides, cyclopentadienylvanadium, halocyclopentadienylvanadium and the like. In some cases, other vanadium compounds capable of forming a coordinated catalyst with an organoaluminum compound may be used such as organic acid salts, phosphates, and salicylates.

Said vanadium compounds include specifically, for example, vanadium tetrachloride, vanadium trichloride, vanadyl trichloride, vanadyl tribromide, vanadium triacetylacetonate, vanadyl diacetylacetonate, vanadyl dichloroacetylacetonate, vanadyl monochlorodiacetylacetonate, ethyl orthovanadate, isobutyl orthovanadate, n-hexyl orthovanadate, cyclohexyl orthovanadate, phenyl orthovanadate, vanadyl diethoxymonochloride, vanadyl diethoxymonobromide, vanadyl di-n-octoxymonochloride, vanadyl monomethoxydichloride, vanadyl monoethoxydichloride, vanadyl stearoxydichloride, dicyclopentadienylvanadium, dicyclopentadienylvanadium dichloride and the like. Among these compounds, particularly vanadyl trichloride, vanadium tetrachloride, and esters of orthovanadic acid are economically advantageous and also give favorable results in most cases.

Preferable titanium compounds are those which have at least one halogen atom or alkoxy group, typical examples thereof being titanium tetrachloride and titanium tetrabutoxide.

Although the process of this invention is a polymerization process which makes use of a catalyst system comprising as essential components the aforesaid organoaluminum compound and transition metal compound, other suitable compounds may be further added as a third component to the catalyst system. Such compounds include, for example, electron-donating compounds having an interaction, such as coordination or charge-transfer, with the organoaluminum compounds, vanadium compounds, or titanium compounds; and various oxidizing substances to keep the aforesaid transition metal compounds from excessive reduction by the organoaluminum compounds, such excessive reduction being detrimental to the catalyst activity.

The electron-donating compounds include, for instance, amines, cyclic nitrogen compounds, acid amides, ethers, esters, ketones, aldehydes, and compounds of the Group Vb elements such as phosphorus, arsenic, antimony, and bismuth. The oxidizing substances include, for example, halogens, sulfur, metal halides, nitro compounds, nitroso compounds, nitrates, nitrites, N-oxides, p-oxides, azo compounds, sulfides, disulfides, quinones, acid halides, etc. Particularly in preparing a quadripolymer according to this invention, the presence of Lewis bases such as amines and ethers is desirable for the purpose of controlling the side reaction between the organoaluminum compounds and the halogenated norbornene compounds. Examples of such compounds are pyridine, triethylamine, tetrahydrofuran, and anisole. Favorable results are obtained when these compounds are used in an amount substantially equimolar to the transition metal catalyst.

In carrying out the process of this invention, the ratio of the organoaluminum compound to the transition metal compound is particularly important. When the molar ratio exceeds 5, the reaction system becomes turbid, indicating a state of suspension of minute particles. Formation of such a heterogeneous phase is due to interaction between the organoaluminum compound and the halogenated norbornene. The minute particles in the heterogeneous phase are occluded in the copolymer during after-treatments but can be extracted by reprecipitation by use of carbon tetrachloride-acetone. This evidently proves that the halogenated norbornene has not copolymerized with ethylene and propylene. Moreover, the copolymer obtained from the heterogeneous system is inferior in halogen content and random property, and hence tends to have an insufficient strength has an elastomer. On the other hand, when both components are used in a molar ratio within the range of from 5:1 to 0.5:1, particularly from 5:1 to 2:1, it is possible to carry out the polymerization without formation of heterogeneous phase and to control the occurrence of side reactions such as dehydrohalogenation to a minimum so that an elastomer of a high halogen content and of excellent random property may be obtained.

The concentration of the vanadium or titanium compound used in the process of this invention is conveniently 0.01 to 50 millimoles, particularly 0.1 to 5 millimoles, per liter of the reaction medium, and that of the organoaluminum compound is conveniently 0.05 to 100 millimoles, particularly 0.5 to 10 millimoles, per liter of the reaction medium.

In practical operation of the process of this invention, the catalyst components can be added to the reaction system in any way. For instance, in one method, the catalyst components are mixed and the mixture is added to the reaction medium containing the monomers, and in another method, the catalyst components are added separately to the reaction system. When a high catalyst activity is required, it is generally recommendable to mix the organoaluminum compound with the vanadium or titanium compound in the presence of the monomers.

The ratio of ethylene to propylene in the reactant solution is properly selected to obtain a copolymer of any desired composition. Generally, a proportion of propylene within the range of 50 to 98 mole percent, particularly 70 to 95 mole percent or thereabout, is conveniently used, though a reaction system of other compositions may be chosen, if necessary.

The hydrocarbon compounds having a plurality of non-conjugated unsaturated bonds have, in general, different relative reactivities with ethylene and propylene. Therefore, in order to obtain a copolymer having excellent vulcanization characteristics in which the said hydrocarbon compound is uniformly distributed throughout the polymer molecule, it is desirable to feed the said hydrocarbon compound continuously or intermittently during copolymerization. It is particularly preferable to conduct the feeding at such a rate that the iodine value of the formed polymer may become substantially constant throughout the progress of polymerization. In such a manner, there is formed, for example, a copolymer having more improved vulcanization characteristics. It is preferable, in general, to add the non-conjugated hydrocarbon component in such an amount that the iodine value of the copolymer will fall within the range of 1 to 100, particularly 2 to 20. The concentration of the said component in the polymerization medium is conveniently 1 to 100 millimoles per liter, though may vary depending upon the rate of formation of the polymer and other conditions.

As for the halogenated norbornene compounds, there is also a difference between relative reactivities with ethylene and propylene. Therefore, in order to obtain a copolymer containing uniformly distributed halogen atoms and having favorable adhesive property and tackiness, it is desirable to feed the halogenated norbornene continuously or intermittently throughout the progress of copolymerization, though copolymerization can, of course, be conducted even when a large excess of said component is added at the beginning of polymerization. The concentration of the said component in the polymerization medium is conveniently 1 to 100 millimoles per liter, though may vary depending upon the rate of formation of the polymer and other conditions.

In carrying out the process of this invention, there may be used various molecular weight regulating agents and other additives including, for example, hydrogen, zincalkyls, allyl halides, and pyridine N-oxide. Particularly in the process of this invention, addition of hydrogen gives favorable results. By use of hydrogen in a reaction system containing the catalyst system of this invention, not only the catalytic activity is generally enhanced, but also a copolymer with a low gel content and having a satisfactory processability is more easily obtained.

When hydrogen is to be used as an additive, it can be added in any way. It may be added in admixture with ethylene and propylene monomers, or may be introduced in the form of a solution in a solvent. The amount of hydrogen to be added may vary depending on polymerization conditions, especially temperature, conversion, and monomer composition, and can be properly predetermined to conform to the desired molecular weight of the objective polymer. In most cases, it is generally adequate to dissolve in the polymerization medium about 0.01 to 50 mole percent of hydrogen based on the amount of ethylene and propylene dissolved in the medium. Particularly when the polymerization temperature is in the neighborhood of room temperature, the presence of about 0.05 to 1 mole percent of hydrogen usually gives a copolymer of a suitable molecular weight. In case of controlling the polymerization by a hydrogen concentration in the vapor phase in equilibrium with the polymerization solution, a hydrogen concentration of about 1 to 60 mole percent is often used. These numerical values, however, are only a guide and, if necessary, other hydrogen ratios can be used, depending on polymerization conditions.

The polymerization reaction can be conducted at any pressure within the range of from reduced pressure to superatmospheric pressure as high as 100 kg/cm$^2$.

As the reaction temperature, there may be used any temperature within the range of from a temperature as low as −78°C to a temperature as high as 120°C., though a temperature within the range of from 20° to 70°C gives generally good results. As the polymerization temperature, there should be the optimum temperatures corresponding to the respective combinations of catalyst components. In selecting the polymerization temperature, it is useful to consider the activity deterioration with the lapse of time. The polymerization process may be either batchwise or continuous, and each monomer and the catalyst may be added to the reaction vessel at one time at the beginning or may be introduced continuously into the reaction vessel.

In carrying out the process of this invention, an inert solvent may generally be used. Alternatively, liquified monomers may be used as the medium. Suitable inert solvents are ordinary hydrocarbon compoounds or halohydrocarbon compounds, for example, propane, butane, pentane, hexane, heptane, octane, petroleum ether, ligroin, other petroleum-based mixed solvents, benzene, toluene, xylene, cyclohexane, methylcyclohexane, methylene dichloride, ethylene dichloride, trichloroethane, tetrachloroethylene, butyl chloride, chlorobenzene, bromobenzene, etc.

On completion of the polymerization reaction, aftertreatment is carried out in an ordinary manner to purify and recover the polymerization product. Applicable procedures of after-treatment are water treatment, steam treatment, alcohol treatment, alcohol-hydrochloric acid treatment, hydrochloric acid-water treatment, alkali treatment, aqueous emulsifier solution treatment, and any after-treatment procedure used in the polymerization process using a Ziegler-Natta catalyst system.

Alternatively, without any of the above-mentioned after-treatments, the polymerization mixture may be salted out or the polymerization mixture as such may be subjected to removal of solvent to recover the solid matters. Further, an antioxidant or other additives may be added during or after the above-mentioned treatment.

The copolymer obtained by the process of this invention is solid at ordinary temperature and is a rubber-like elastomer, which generally can be milled on a rollmill and can be subjected to conventional sulfur-curing. As compared with a conventional EPT rubber, the present copolymer is markedly improved particularly in tackiness, adhesion, and rate of curing, owing to the presence of halogen atoms in the molecule. It can be cross-linked also with metal oxides or with peroxides.

Since ethylene-propylene-diene terpolymers are excellent in weather resistance, thermal resistance and ozone resistance, they are often used to be blended with at least one diene rubber, such as natural rubber, SBR, butadiene rubber, isoprene rubber, etc., or butyl rubber. However, the terpolymers have low co-vulcanizability with the diene rubbers, and the physical properties of the blends are remarkably inferior to those of the diene rubbers alone. Therefore, in general, the terpolymers have been blended in very small proportions with the diene rubbers. On the other hand, the quadripolymers obtained by the process of this invention are excellent in co-vulcanizability with the diene rubbers, and may be blended in an amount of 10 to 80 percent by weight with the diene rubbers according to objects.

The halogen atoms introduced into the present copolymer greatly affect the physical properties of the copolymer, and even a very low halogen content manifests considerable effect. However, it is generally desirable to introduce 0.3 percent by weight or more of halogen. In order that the copolymer may acquire sufficiently random amorphous structure, the halogen content is preferably 10 percent by weight or less, and the molar ratio of ethylene units to propylene units is preferably within the range of from 8 : 2 to 2 : 8. Depending upon the ethylene-to-propylene ratio, a halogen content of more than 10 percent may, in some cases, be tolerable.

The invention is illustrated below in further detail with reference to Examples, but the scope of this invention is not limited to the Examples.

EXAMPLE 1

Into a 2-liter separable flask provided with a gas inlet, in which the air had been thoroughly replaced by nitrogen, was introduced 1 liter of n-hexane, and the inside temperature was maintained at 30°C. A mixed gas of 40 mole percent of ethylene and 60 mole percent of propylene was passed through the flask at a rate of 10 liters per minute. After 20 minutes, 1 1 millimole of 5-ethylidene-2-norbornene and 10 millimoles of 5-chloromethyl-2-norbornene were added to the flask. After the mixture in the flask had been thoroughly stirred, 4 millimoles of ethylaluminum sesquichloride and 2 millimoles of vanadyl trichloride Al/V = 2/1) were added to the system to initiate polymerization while continuing the stirring and passing through the mixed gas. After continuing the reaction for 30 min, 15 ml of methanol was added to terminate the polymerization. The solution was withdrawn and thoroughly admixed with about 100 ml of a methanol solution containing 0.4 percent of 2,6-di-tert-butyl-p-cresol to remove the catalyst. The polymer-containing n-hexane solution was poured into a large volume of methanol to precipitate a white elastomeric copolymer. The precipitated copolymer was dried in vacuo at 60°C to yield 6.47 g of a copolymer having an intrinsic viscosity [$\eta$] of 0.90 dl/g, as measured in xylene at 70°C., and a propylene content of 29.3 mole percent. A portion of the polymer was dissolved in carbon tetrachloride and poured into a large volume of acetone to reprecipitate the polymer. The polymers before and after reprecipitation were analyzed for chlorine to abtain the following results: The chlorine contents before and after reprecipitation were 1.60 percent and 1.52 percent by weight, respectively. The result of chlorine analysis showed that the copolymer contained 6.11 percent by weight of 5-chloromethyl-2-norbornene monomeric units.

On the other hand, under conditions similar to those mentioned above, polymerization was initiated with 4 millimoles of ethylaluminum sesquichloride and 0.4 millimole of vanadyl trichloride (Al/V = 10/1). The polymerization system became turbid and a heterogeneous reaction took place. After 30 minutes, the reaction mixture was subjected to an after-treatment similar to that mentioned above to obtain 18.70 g of a white, elastomeric copolymer having an intrinsic viscosity of 2.08 dl/g and a propylene content of 29.1 mole percent. Chlorine analysis revealed that the chlorine content of the polymer was 0.55 percent by weight before reprecipitation and 0.15 percent by weight after reprecipitation, indicating that 5-chloromethyl-2-norbornene is very difficult to copolymerize under the above-said polymerization conditions.

EXAMPLE 2

Into a 3-liter separable flask provided with a gas inlet, in which the air had been thoroughly replaced by nitrogen, was introduced 2 liters of n-hexane, and the flask was placed in a thermostat to maintain the inside temperature at 30°C. A mixed gas of 40 mole percent of ethylene and 60 mole percent of propylene was passed through the flask at a rate of 10 liters per minute. After the lapse of 20 minutes, 20 millimoles of 5-ethylidene-2-norbornene, 30 millimoles of 5-chloromethyl-2-norbornene, 16 millimoles of ethylaluminum sesquichloride, and 3.2 millimoles of vanadyl trichloride were added in 5 portions intermittently at 10 minutes intervals with stirring to allow the reaction to proceed. After the last addition, the reaction was continued for a further 30 minutes and then terminated by addition of 20 ml of methanol. After-treatment was carried out in a manner similar to that in Example 1 to obtain 124 g of a copolymer having an intrinsic viscosity $[\eta]$ of 2.29 dl/g as measured in xylene at 70°C., a propylene content of 32.9 mole percent, an iodine value of 6.8, and a chlorine content of 0.05 percent by weight (the chlorine content is that of the polymer after reprecipitation and the same shall apply hereinafter), indicating that the polymer contained 2.0 percent by weight of 5-chloromethyl-2-norbornene monomeric units.

One hundred parts by weight of the above-mentioned copolymer was compounded with 50 parts by weight of HAF carbon black, 5 parts by weight of zinc oxide, 1 part by weight of stearic acid, 1 part by weight of tetramethylthiuram monosulfide, 0.25 part by weight of mercaptobenzothiazole, and 1.0 part by weight of sulfur and vulcanized at 160°C. for 15 minutes to obtain a rubber having a modulus at 300 percent elongation of 137 kg/cm$^2$, a tensile strength of 299 kg/cm$^2$ and an elongation of 490 percent.

During the above-said vulcanization, the rate of vulcanization of the present copolymer was compared with that of an ethylene-propylene-ethylidenenorbornene copolymer by use of "Rheometer" at 160°C. and 6 rpm. The maximum change in torque with time ($\mathcal{U}_{max}$ kg·cm/min) of the present copolymer was 1.65 and that of the EP(ENB) copolymer was 0.43, and this indicates that the rate of vulcanization of the present copolymer is several times as large as that of the EP(ENB) copolymer.

Further, the physical properties of the cured blend of the copolymer obtained above with SBR 1,500 are shown in Table 1, in which the physical properties of the cured blend of the EP(ENB) copolymer with SBR are also shown for comparison.

Table 1

| | Present quadripolymer | EP(ENB) |
|---|---|---|
| $[\eta]$ (dl/g) | 2.29 | 2.46 |
| Propylene content (mole %) | 32.9 | 36.3 |
| Iodine value | 6.8 | 7.0 |
| Chlorine content | | |

Table 1-Continued

| | Present quadripolymer | | EP(ENB) | |
|---|---|---|---|---|
| (wt %) | 0.50 | | 0 | |
| Weight ratio of copolymer/SBR | 75/25 | 30/70 | 75/25 | 30/70 |
| Tensile strength* at break ($T_B$) (kg/cm$^2$) | 98 | 150 | 45 | 112 |
| Elongation at break ($E_B$) (%) | 270 | 320 | 240 | 290 |

Note: *Compounding recipe: Same as above, except that the polymer blend was substituted for the copolymer. Vulcanization conditions: 160°C. 15 min.

As is clear from the above, the present quadripolymer is superior in co-vulcanizability with diene rubber to the EP(ENB) copolymer.

EXAMPLE 3

A continuous polymerization under pressure was carried out at 44°C. by using a 2-liter stainless steel autoclave. While feeding n-hexane at a flow rate of 3 liters per hour, ethylene and propylene were dissolved therein under a pressure of 20 kg/cm$^2$ (gauge) and the residence time as a whole was adjusted to 16 minutes. The ethylene-to-propylene weight ratio was adjusted to 5 : 1. On the other hand, ethylaluminum sesquichloride, vanadyl trichloride, 5-chloromethyl-2-norbornene, and 5-ethylidene-2-norbornene, each dissolved in n-hexane, were separately and continuously fed to the reactor. The molar ratio of ethylaluminum sesquichloride to vanadyl trichloride was 3 : 1, and the concentration of the aluminum-containing component in the reaction system was kept at about 7 millimoles per liter. The feeding rate of 5-ethylidene-2-norbornene was regulated so that the iodine value of the formed polymer became about 13, and an equimolar amount of 5-chloromethyl-2-norbornene was added. In such a manner, operation was continued for 5 hours. The resulting polymer solution in n-hexane (about 80 g/liter) was subjected to an after-treatment in a conventional manner to obtain a copolymer having the following structural characteristics: intrinsic viscosity, 1.41 dl/g; propylene content, 38.1 mole percent; iodine value, 13.5; Mooney viscosity, $ML_{1+4}^{100°C}$, 48; chlorine content, 0.48 percent by weight. The polymer was compounded in accordance with the same recipe as in Example 2 and vulcanized. The physical properties of the vulcanizate were compared with those of a conventional EP(ENB) (ethylenepropylene-ethylidenenorbornene terpolymer). As shown in Table 2, the present polymer showed superior tackiness.

Table 2

| | | Copolymer of Ex. 3 | EP(ENB) |
|---|---|---|---|
| $ML_{1+4}$ (100°C.) | | 48 | 54 |
| Propylene content (mole-%) | | 38 | 36 |
| Iodine value | | 13.5 | 18.2 |
| Tackiness of compound | (g/14 mm) | 710 | 460 |
| $M_{300}$ (160°C./15 min.) | (kg/cm$^2$) | 150 | 145 |
| $T_B$ do. | (kg/cm$^2$) | 229 | 218 |
| $E_B$ do. | (%) | 740 | 600 |

Further, each of the above-mentioned two polymers was vulcanized at 160°C. for 20 minutes and two specimens of each vulcanizate were bonded by means of 100 parts by weight of "S-Tack No. 1" and 3 parts by weight of "Desmodur" (Bayer Co.) as an adhesive. After having been kept at room temperature for 48 hours, the bonded specimens were tested for bond strength at a drawing speed of 20 mm per minute. The copolymer of Example 3 showed a superior value of 2.5 kg/cm$^2$ as compared with 1.0 kg/cm$^2$ in the case of EP-(ENB).

EXAMPLE 4

Into a 2-liter separable flask, in which the air had been thoroughly replaced by nitrogen, was introduced 1 liter of toluene, and the inside temperature was kept at 20°C. A mixed gas of 33.3 mole percent of ethylene, 50 mole percent of propylene, and 16.7 mole percent of hydrogen was passed through the flask at a rate of 12 liters per minute. After 20 minutes, to the system were added 1 millimole of dicyclopentadiene and 30 millimoles of 5-chloromethyl-2-norbornene, and then 2 millimoles of ethylaluminum sesquichloride and 0.4 millimole of vanadyl trichloride were added thereto, and the resulting mixture was subjected to reaction for 30 minutes. After-treatment was carried out in a manner similar to that in Example 1 to yield 6.98 g of a copolymer having an intrinsic viscosity of 0.89 dl/g, a propylene content of 14.7 mole percent, and a chlorine content of 2.99 percent by weight.

EXAMPLE 5

The procedure of Example 1 was repeated using the same apparatus as in Example 1, except that the following modification was made: To the system were added 10 millimoles of 5-ethylidene-2-norbornene and 10 millimoles of 5-chloromethyl-2-norbornene, and then 3 millimoles of diethylaluminum chloride and 1 millimole of vanadyl trichloride were added to initiate polymerization. After 30 minutes, the polymerization was terminated and the reaction mixture was subjected to after-treatment to obtain 7.49 g of a copolymer. The intrinsic viscosity thereof was 1.06 dl/g, the propylene content, 21.1 mole percent, the iodine value, 45.7, and the chlorine content, 1.00 percent by weight.

EXAMPLE 6

The procedure of Example 1 was repeated using the same apparatus as in Example 1, except that the following modification was made: Polymerization was effected by using 2 millimoles of triethylaluminum as the organoaluminum compound and 0.4 millimole of vanadium tetrachloride as the transition metal compound, provided that the composition of the mixed gas was 40 mole percent of ethylene and 60 mole percent of propylene, and each of the amounts of 5-ethylidene-2-norbornene and 5-chloromethyl-2-norbornene used was 10 millimoles. The resulting copolymer weighed 2.65 g and had an intrinsic viscosity of 1.21 dl/g and a chlorine content of 0.50 percent by weight.

EXAMPLE 7

The procedure of Example 1 was repeated using the same apparatus as in Example 1, except that the following modification was made: While passing a mixed gas of ethylene and propylene, to the system were added 10 millimoles of 5-ethylidene-2-norbornene and 10 millimoles of 5-chloromethyl-2-norbornene, and then 0.4 millimole of pyridine as added. Polymerization was then initiated by the addition of 2 millimoles of ethylaluminum sesquichloride and 0.4 millimole of vanadyl trichloride, and the reaction was allowed to proceed for 30 minutes. The reaction mixture was subjected to a conventional after-treatment to obtain 9.19 g of a copolymer having an intrinsic viscosity of 1.47 dl/g, a propylene content of 28.3 mole percent, an iodine value of 32.4, and a chlorine content of 1.06 percent by weight.

EXAMPLE 8

The procedure of Example 1 was repeated using the same apparatus as in Example 1, except that the following modification was made: To the system were added 10 millimoles of 5-ethylidene-2-norbornene and 10 millimoles of 5-bromomethyl-2-norbornene, and polymerization was initiated with 3 millimoles of ethylaluminum sesquichloride and 1 millimole of vanadyl trichloride to obtain 6.69 g of a copolymer having an intrinsic viscosity of 1.07 dl/g, a propylene content of 21.9 mole percent, and a bromine content of 2.18 percent by weight.

EXAMPLE 9

Under the same conditions as in Example 8, 5-chloro-2-norbornene was used in place of 5-bromomethyl-2-norbornene to obtain 16.19 g of a copolymer having an intrinsic viscosity of 1.97 dl/g, a propylene content of 30.2 mole percent, an iodine value of 15.0, and a chlorine content of 0.39 percent by weight. By using the same compounding formula as in Example 2, the copolymer was vulcanized at 160°C. for 40 minutes, to obtain a rubber having $M_{200}$ of 197 kg/cm$^2$, a tensile strength of 238 kg/cm$^2$, and an elongation of 360 percent.

EXAMPLE 10

Under the same conditions as in Example 8, 5,5,6-trichloro-2-norbornene was used in place of 5-bromomethyl-2-norbornene to obtain 17.05 g of a copolymer having an intrinsic viscosity of 3.99 dl/g, a propylene content of 28.7 mole percent, an iodine value of 18.0, and a chlorine content of 0.59 percent by weight. The copolymer was vulcanized in a manner similar to that in Example 2 to obtain a rubber having $M_{200}$ of 116 kg/cm$^2$, a tensile strength of 116 kg/cm$^2$, and an elongation of 200 percent.

EXAMPLE 11

Under the same conditions as in Example 8, except that 10 millimoles of 5-ω-chlorooctyl-6-octyl-2-norbornene was substituted for the 5-bromomethyl-2-norbornene, polymerization was effected to obtain 13.21 g of a copolymer having an intrinsic viscosity of 1.38 dl/g, a propylene content of 26.3 mole percent an iodine value of 14.7, and a chlorine content of 0.45 percent by weight.

EXAMPLE 12

Into the same flask as in Example 1 were introduced 1 liter of n-hexane and 150 g of butene-1, and the inside temperature was maintained at 30°C. Into the flask was introduced gaseous ethylene at a rate of 4 liters per minute. After 20 minutes, to the system were added 10 millimoles of 5-chloromethyl-2-norbornene and 10 millimoles of 5-ethylidene-2-norbornene, and then 2 millimoles of ethylaluminum sesquichloride and 0.4 millimole of vanadyl trichloride were added to initiate polymerization. After 30 minutes, the polymerization was terminated and the reaction mixture was subjected to a conventional after-treatment to obtain 3.73 g of ethylene-butene-1-ethylidenenorbornene-chloromethylnorbornene quadripolymer having an intrinsic viscosity of 0.73 dl/g and a chlorine content of 0.53 percent by weight.

What is claimed is:

1. A process for producing a halogen-containing, sulfur-curable, normally amorphous guadripolymer, which comprises contacting a mixture comprising (1) ethylene, (2) an α-olefin of the formula $R-CH=CH_2$ wherein R is a hydrocarbon radical having 1 to 20 carbon atoms, (3) a hydrocarbon compound having a plurality of non-conjugated unsaturated bonds capable of polymerizing with a coordinated catalyst, and (4) a halogenated norbornene compound represented by the formula,

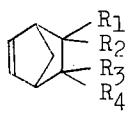

wherein $R_1$, $R_2$, $R_3$ and $R_4$ are hydrogen atoms, hydrocarbon radicals having one to 20 carbon atoms, halogen atoms, or halogenated hydrocarbon radicals having one to 20 carbon atoms and containing at least one halogen atom as substituent, provided that $R_1$, $R_2$, $R_3$ and $R_4$ have as a whole at least one halogen atom, with a coordinated catalyst comprising an organoaluminum compound of the formula, $AlR'_n X_{3-n}$ wherein $R'$ is a hydrocarbon radical having one to 20 carbon atoms; X is a halogen atom; and n is any number of from 1.5 to 3 and a transition metal compound selected from the group consisting of vanadium compounds and titanium compounds, the molar ratio of said organoaluminum compound to said transition metal compound being from 5 : 1 to 5 : 1.

2. A process according to claim 1, wherein the mixture of monomers is contacted with the coordinated catalyst at a temperature of from −78° to 120°C.

3. A process according to claim 1, wherein the mixture of monomers is contacted with the coordinated catalyst at a temperature of from 20° to 70°C.

4. A process according to claim 1, wherein R of the α-olefin is an alkyl, aryl, aralkyl, alkylaryl, or cycloalkyl group having one to 20 carbon atoms.

5. A process according to claim 1, wherein the α-olefin is propylene, butene-1, pentene-1, 4-methylpentene-1, hexene-1, heptene-1, octene-1, nonene-1, decene-1, 5-methylnonene-1, 5,5-dimethyloctene-1, 4-methylhexene-1, 4-methylheptene-1, 6-methylheptene-1, 5,6,6-trimethylheptene-1, styrene, 4-phenylheptene-1, or 4-cyclohexylhexene-1.

6. A process according to claim 1, wherein the 2-olefin is propylene or butene-1.

7. A process according to claim 1, wherein the hydrocarbon compound having a plurality of non-conjugated unsaturated bonds is a non-conjugated polyene selected from the group consisting of dicylopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1'-butenyl)-2-norbornene, 5-(2'-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 1,4-hexadiene, 1,6-octadiene, and 6-methyl-1,5-heptadiene.

8. A process according to claim 1, wherein the halogenated norbornene compound is 5-chloro-2-norbornene, 5-bromo-2-norbornene, 5-iodo-2-norbornene, 5,5-dichloro-2-norbornene, 5,6-dichloro-2-norbornene, 5,5,6-trichloro-2-norbornene, 5-chloro-6-methyl-2-norbornene, 5-chloromethyl-2-norbornene, 5-bromomethyl-2-norbornene, 5,6-dichloromethyl-2-norbornene, 5,6-dibromomethyl-2-norbornene, 5,5,6,6-tetrachloronorbornene, 5-(1',2'-dichloroethyl)-2-norbornene, or 5-ω-chlorooctyl-6-octyl-2-norbornene.

9. A process according to claim 6, wherein the non-conjugated polyene is 5-ethylidene-2-norbornene or 5-isopropylidene-2-norbornene.

10. A process according to claim 9, wherein the halogenated norbornene compound is 5-chloromethyl-2-norbornene or 5-bromomethyl-2-norbornene.

11. A process according to claim 1, wherein R' of the organoaluminum compound is an alkyl, aryl, aralkyl, alkylaryl, or cycloalkyl group having one to 20 carbon atoms.

12. A process according to claim 1, wherein the organoaluminum compound is ethylaluminum sesquichloride, ethylaluminum sesquibromide, ethylaluminum sesquiiodide, methylaluminum sesquichloride, n-propylaluminum sesquichloride, isobutylaluminum sesquichloride, n-hexylaluminum sesquichloride, cyclohexylaluminum sesquichloride, 2-ethylhexylaluminum sesquichloride, laurylaluminum sesquichloride, diethylaluminum chloride, dimethylaluminum chloride, di-n-butylaluminum chloride, ethylpropenylaluminum chloride, dicyclopentadienylaluminum chloride, cyclohexylethylaluminum chloride, trimethylaluminum, triethylaluminum, tripropylaluminum, triisobutylaluminum, trihexylaluminum, tridecylaluminum, triphenylaluminum, tricyclohexylaluminum, or tribenzylaluminum.

13. A process according to claim 1, wherein the organoaluminum compound is an ethylaluminum sesquihalide, a diethylaluminum halide, or a mixture of these compounds.

14. A process according to claim 1, wherein the transition metal compound is a tri- to pentavalent vanadium compound selected from the group consisting of vanadium halides, vanadyl halides, vanadium acetylacetonate, vanadyl acetylacetonate, vanadium haloacetylacetonates, vanadyl haloacetylacetonates, esters of orthovanadic acid containing a hydrocarbon radical of one to 20 carbon atoms, vanadyl haloalkoxides, cyclopentadienylvanadium, and halocyclopentadienylvanadiums.

15. A process according to claim 1, wherein the transition metal compound is vanadium tetrachloride, vanadium trichloride, vanadyl trichloride, vanadyl tribromide, vanadium triacetylacetonate, vanadyl acetylacetonate, vanadyl dichloroacetylacetonate, vanadyl monochlorodiacetylacetonate, ethyl orthovanadate, n-hexyl orthovanadate, cyclohexyl orthovanadate, phenyl orthovanadate, vanadyl diethoxymonochloride, vanadyl diethoxymonobromide, vanadyl di-n-octoxymonochloride, vanadyl monomethoxydichloride, vanadyl monoethoxydichloride, vanadyl monostearoxydichloride, dicyclopentadienylvanadium, or dicyclopentadienylvanadium dichloride.

16. A process according to claim 1, wherein the transition metal compound is vanadyl trichloride, vanadium tetrachloride, or an ester of orthovanadic acid.

17. A process according to claim 1, wherein the transition metal compound is titanium tetrachloride or titanium tetrabutoxide.

18. A process according to claim 1, wherein the catalyst contains as a third component an electrondonating compound selected from the group consisting of amines, cyclic nitrogen compounds, acid amides, ethers, esters, ketones, and compounds of the Group Vb elements.

19. A process according to claim 1, wherein the catalyst contains as a third component an oxidizing compound selected from the group consisting of halogens, sulfur, metal halides, oxygen, nitro compounds, nitroso compounds, nitrates, nitrites, N-oxides, P-oxides, azo compounds, sulfides, disulfides, quinones, and acid halides.

20. A process according to claim 1, wherein the molar ratio of the organoaluminum compound to the transition metal compound is from 5 : 1 to 2 : 1.

21. A process according to claim 1, wherein the concentration of the transition metal compound in a reaction medium is 0.01 to 50 millimoles per liter.

22. A process according to claim 1, wherein the concentration of the organoaluminum compound in a reaction medium is 0.05 to 100 millimoles per liter.

23. A process according to claim 1, wherein the proportion of the propylene in the monomer mixture is 50 to 98 mole percent.

* * * * *